(12) United States Patent
Chen et al.

(10) Patent No.: US 8,434,726 B2
(45) Date of Patent: May 7, 2013

(54) MOUNTING APPARATUS FOR DATA STORAGE DEVICE

(75) Inventors: Yun-Lung Chen, New Taipei (TW); Liang-Chin Wang, New Taipei (TW); Jian Hu, Wuhan (CN); Yu-Ming Xiao, Wuhan (CN); Hai-Qing Zhu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/272,538

(22) Filed: Oct. 13, 2011

(65) Prior Publication Data
US 2012/0305720 A1 Dec. 6, 2012

(51) Int. Cl.
*G06F 1/16* (2006.01)

(52) U.S. Cl.
USPC ............... 248/220.21; 248/27.3; 248/918; 312/223.1

(58) Field of Classification Search ............. 248/220.21, 248/221.11, 222.11, 918, 27.3; 312/223.1, 312/223.2; 361/679.02, 679.31, 679.32, 361/679.33, 679.37, 679.4, 679.41
See application file for complete search history.

(56) References Cited

U.S. PATENT DOCUMENTS

| | | | |
|---|---|---|---|
| 6,826,045 B2 * | 11/2004 | Chen | 361/679.33 |
| 7,259,960 B2 * | 8/2007 | Hua et al. | 361/679.33 |
| 7,483,263 B2 * | 1/2009 | Chen et al. | 361/679.02 |
| 7,542,271 B2 * | 6/2009 | Chen et al. | 361/679.33 |
| 7,643,280 B2 * | 1/2010 | Chen | 361/679.33 |
| 7,950,752 B2 * | 5/2011 | Lin | 312/333 |
| 2008/0000849 A1 * | 1/2008 | Zhang et al. | 211/26.2 |

* cited by examiner

*Primary Examiner* — Terrell McKinnon
*Assistant Examiner* — Steven Marsh
(74) *Attorney, Agent, or Firm* — Altis Law Group, Inc.

(57) ABSTRACT

A mounting apparatus for mounting a data storage device on a bracket includes a locating member fixed on the bracket. The bracket includes a sidewall defining a first through hole and a second through hole at a sidewall back. The sidewall defines a first fixing slot and a second fixing slot at a sidewall front. The data storage device defines a fixing hole. A fixing portion is located on a first end of the locating member corresponds to the first through hole, the second through hole and the fixing hole. A locking portion is located on a second end of the locating member corresponds to the first fixing slot and the second fixing slot. The data storage device is fixed on a first position and a second position of the bracket.

20 Claims, 5 Drawing Sheets

MOUNTING APPARATUS FOR DATA STORAGE DEVICE

BACKGROUND

1. Technical Field

The present disclosure relates to mounting apparatuses, and particularly to a mounting apparatus for mounting a data storage devices.

2. Description of Related Art

Many data storage devices, such as hard disk drives, floppy disk drives, and optical drives are simply screwed to a drive bracket of a computer enclosure. However, this conventional method of mounting data storage devices is known as being painstaking and time-consuming.

Another mounting method is to use sliding members. Two sliding members are secured on two sides of a data storage device. A hole is defined in a front portion of each of the sliding members. A drive bracket defines a pair of guiding slots and two threaded holes in a front portion. The two sliding members slide into the guiding slots of the drive bracket, and two screws extend through the holes and screw in the threaded holes to secure the data storage device on the drive bracket. The data storage device is thus easily mounted. However, this method is still inconvenient, for screws are also needed to stably mount the data storage device.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
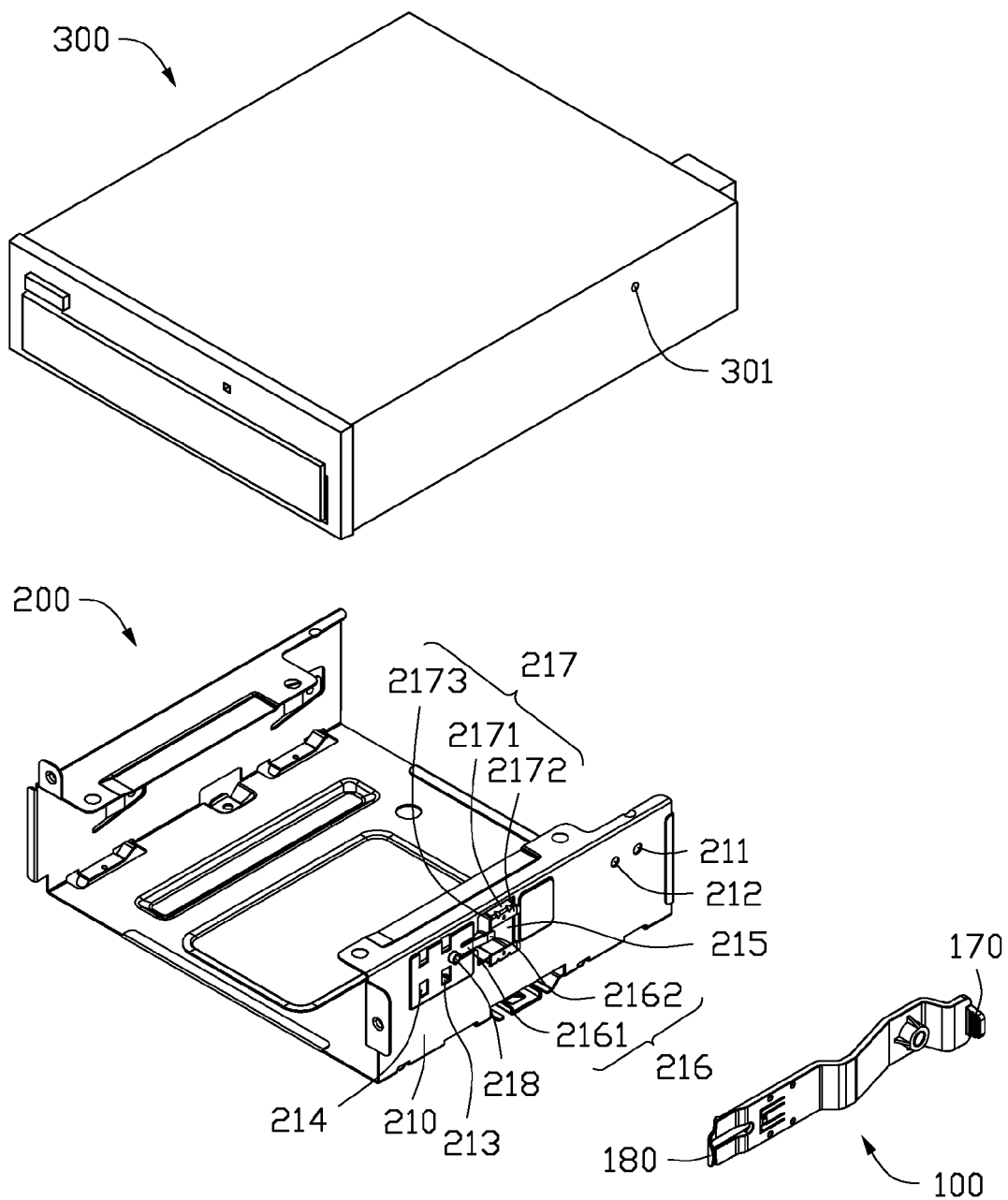
FIG. 1 is an isometric and exploded view of an exemplary embodiment of a mounting apparatus for a data storage device.
Figure 2:
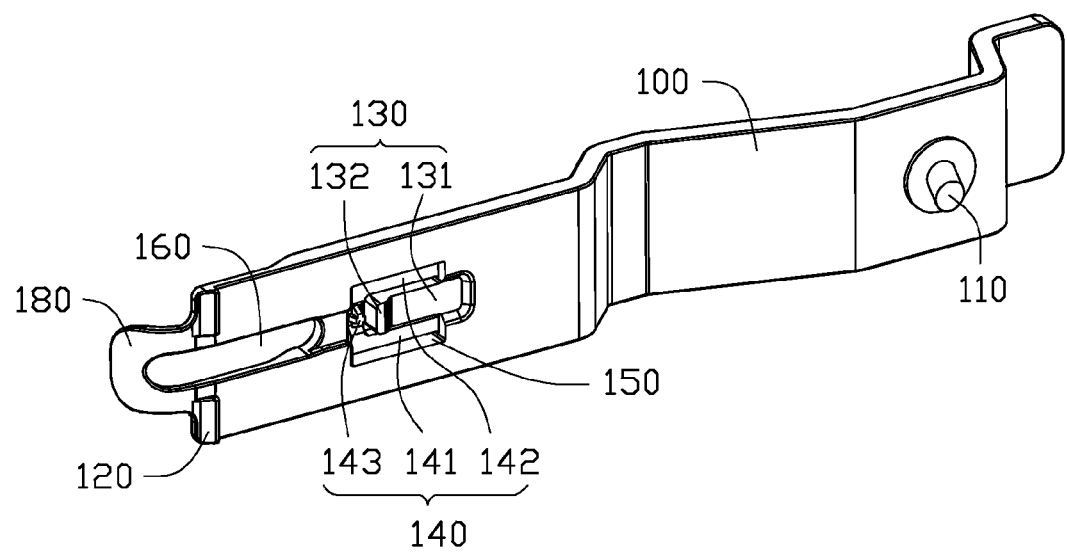
FIG. 2 is an isometric view of a location member of the mounting apparatus of FIG. 1.

Referring to FIGS. 1 and 2, a mounting apparatus for mounting a data storage device 300 on a bracket 200 includes a locating member 100. The data storage device 300 defines a fixing hole 301.

A fixing portion 110 is located on a first end of the locating member 100. Two locking portions 120 are located on a second end of the locating member 100. A resisting portion 130 is located on the locating member 100 between the fixing portion 110, and the two locking portions 120, a pressing portion 140, and a first opening 150 are adjacent to the resisting portion 130. The resisting portion 130 includes a first elastic slice 131 extending from a side edge of the first opening 150, and a first protrusion 132 extends from a side edge of the first elastic slice 131.

The pressing portion 140 includes a second elastic slice 141 and a third elastic slice 142 extending from the side edge of the first opening 150. The second elastic slice 141 and the third elastic slice 142 are located on two sides of the first elastic slice 131. A second protrusion 143 is located between the second elastic slice 141 and the third elastic slice 142. The locating member 100 defines a sliding slot 160, on the second end adjacent to the first opening 150, and a first handle 170, on the first end adjacent to the fixing portion 110. The locating member 100 defines a second handle 180 on the second end adjacent to the sliding slot 160. In one embodiment, the second handle 180 is arc shaped.

The bracket 200 includes a sidewall 210. The sidewall 210 defines a first through hole 211 and a second through hole 212 at a back of the sidewall 210. The sidewall 210 defines two first fixing slots 213 and two second fixing slots 214 at a front of the sidewall 210. The sidewall 210 defines a second opening 215 and a blocking portion 216 thereon between the second through hole 212 and the first fixing slots 213. The blocking portion 216 includes a fourth elastic slice 2161 extending from a side edge of the second opening 215, and a bendable portion 2162 extending from a side edge of the fourth elastic slice 2161. A thickness of the first protrusion 132 is greater than that of the first elastic slice 131 and the bendable portion 2162.

Two guiding portions 217 are extending from an upper edge and a lower edge of the second opening 215. Each guiding portion 217 includes a connection wall 2171 extending from the upper edge or the lower edge of the second opening 215, and a top wall 2172 extending from a side edge of the connection wall 2171. The connection wall 2171 is perpendicular to the sidewall 210, and the top wall 2172 is parallel to the sidewall 210. The sidewall 210, the connection wall 2171, and the top wall 2172 corporately form a guiding slot 2173 therebetween. A guiding protrusion 218 is defined at the front of the sidewall 210. The guiding protrusion 218 is capable of sliding in the sliding slot 160.

Figure 3:
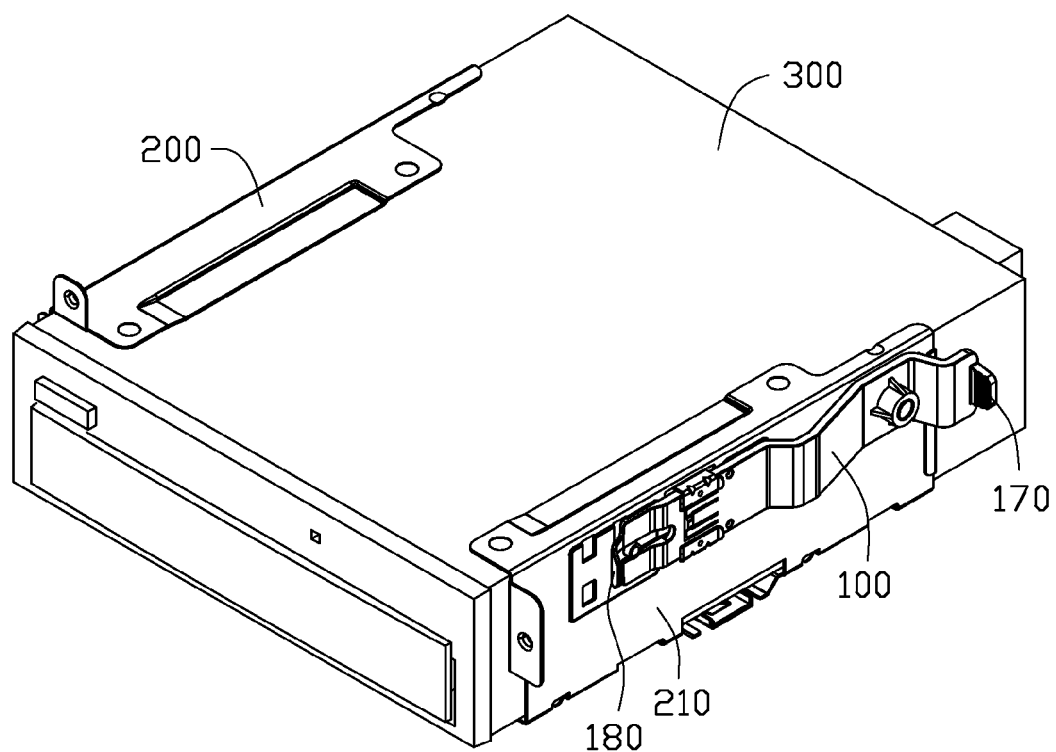
FIG. 3 is an assembly view of the mounting apparatus of FIG. 1, with the data storage device being fixed on a first position.
Figure 4:
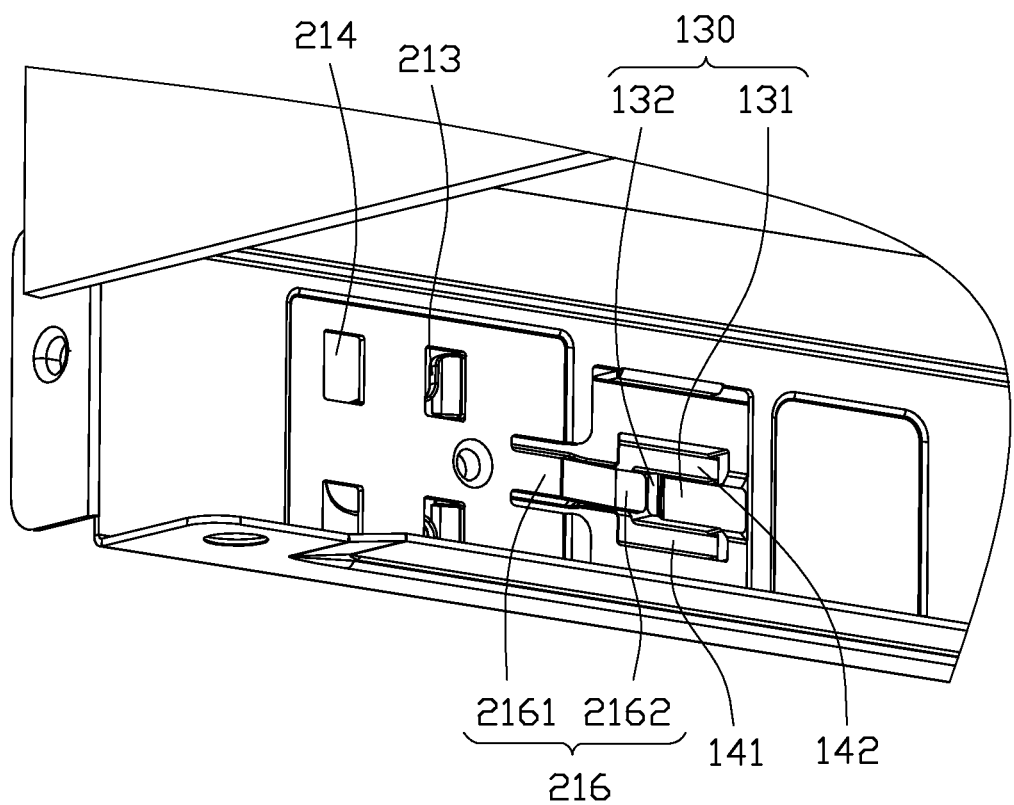
FIG. 4 is an isometric view of the mounting apparatus of FIG. 3, viewed from another aspect.
Figure 5:
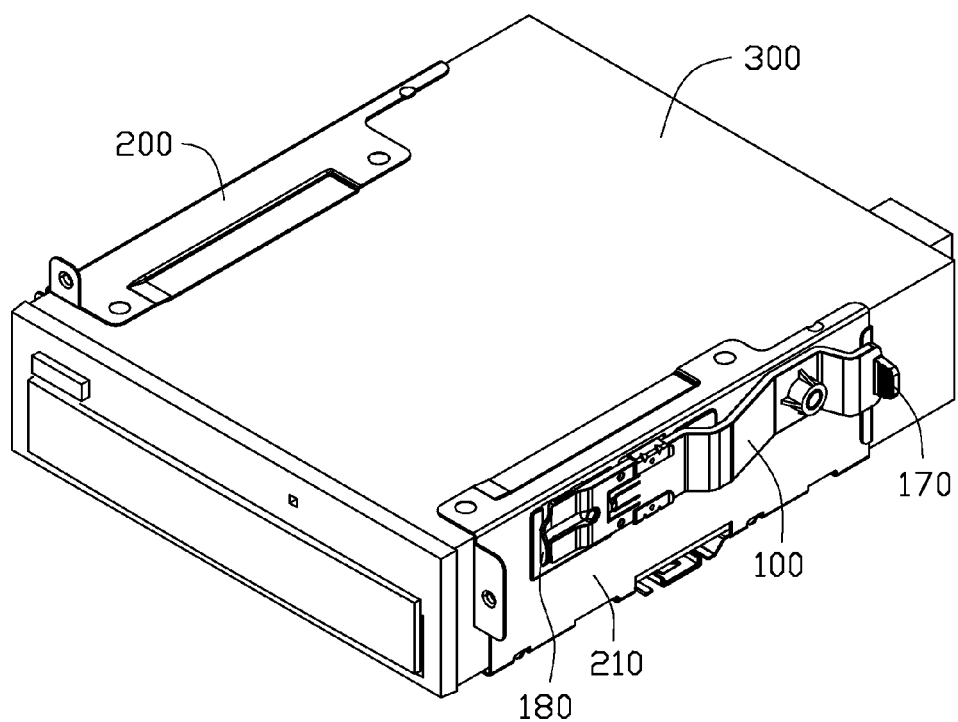
FIG. 5 is an assembly view of the mounting apparatus of FIG. 1, with the data storage device being fixed on a second position.

Referring to FIGS. 3 to 5, in assembly, the data storage device 300 is positioned on the bracket 200. The fixing hole 301 is in alignment with the first through hole 211. One side of the data storage device 300 contacts the sidewall 210. The second handle 180 is drawn toward the guiding protrusion 218 along the two guiding slots 2173. The guiding protrusion 218 slides in the sliding slot 160 until the two locking portions 120 engage with the two first fixing slots 213. The fixing portion 110 passes through the first through hole 211 and the fixing hole 301. The data storage device 300 is fixed in a first position in the bracket 200. The bendable portion 2162 resists the first protrusion 132. The second protrusion 143 is in alignment with the bendable portion 2162.

When the data storage device 300 is fixed on a front position of the bracket 200, the first handle 170 is pulled out of the first through hole 211 and the fixing hole 301. The data storage device 300 is drawn to move in the bracket 200 until the second through hole 212 is in alignment with the fixing hole 301. The second protrusion 143 is pressed toward the bendable portion 2162 until the first protrusion 132 disengages with the bendable portion 2162. The second handle 180 is drawn away from the guiding protrusion 218 along the two guiding slots 2173. The guiding protrusion 218 slides in the sliding slot 160 until the two locking portions 120 engage with the two second fixing slots 214. The fixing portion 110 pass through the second through hole 212 and the fixing hole 301. The data storage device 300 is fixed on a second position in the bracket 200. The guiding protrusion 218 resists a distal end of the sliding slot 160.

Even though numerous characteristics and advantages of the present disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A mounting apparatus for mounting a data storage device on a bracket, comprising:
   a locating member fixed on the bracket, wherein the bracket comprises a sidewall defining a first through hole and a second through hole at a sidewall back, and the data storage device defines a fixing hole thereon;
   a fixing portion located on a first end of the locating member corresponds to the first through hole, the second through hole and the fixing hole, wherein the sidewall defines a first fixing slot and a second fixing slot at a sidewall front; and
   a locking portion located on a second end of the locating member corresponds to the first fixing slot and the second fixing slot, wherein the data storage device is fixed on a first position and a second position of the bracket, in the first position, the fixing portion passes through the first through hole and the fixing hole and the locking portion engages with the first fixing slot, and in the second position, the fixing portion passes through the second through hole and the fixing hole and the locking portion engages with the second fixing slot.

2. The mounting apparatus of claim 1, wherein a resisting portion is located on the locating member between the fixing portion and the locking portion, a blocking portion is located on the sidewall between the first through hole, the second through hole and the first fixing slot, the second fixing slot, when the data storage device is fixed on the first position of the bracket, the resisting portion resists the blocking portion, and when the data storage device is fixed on the second position of the bracket, the resisting portion disengages with the blocking portion.

3. The mounting apparatus of claim 2, wherein a pressing portion is located on the locating member adjacent to the resisting portion; when the data storage device is fixed on the first position in the bracket, the pressing portion is in aligned with the blocking portion; and when the pressing portion is pressed toward the blocking portion, the blocking portion disengages with the resisting portion, and the locating member is moved from the first position to the second position.

4. The mounting apparatus of claim 3, wherein a first opening is located on the locating member between the fixing portion an the locking portion; the resisting portion comprises a first elastic slice extending from a side edge of the first opening, and a first protrusion extending from a side edge of the first elastic slice; and when the data storage device is fixed on the first position in the bracket, the first protrusion resists the blocking portion.

5. The mounting apparatus of claim 4, wherein the pressing portion comprises a second elastic slice and a third elastic slice extending from the side edge of the first opening; the second elastic slice and the third elastic slice are located on two sides of the first elastic slice; and a second protrusion is located between the second elastic slice and the third elastic slice.

6. The mounting apparatus of claim 4, wherein the sidewall defines a second opening between the first through hole, the second through hole and the first fixing slot, the second fixing slot; two guiding portions extend from an upper edge and a lower edge of the second opening; each guiding portion comprises a connection wall extending from the upper edge and the lower edge of the second opening, and a top wall extending from a side edge of the connection wall; the sidewall, the connection wall, and the top wall corporately forms a guiding slot therebetween; and the locating member slides along the two guiding slots when the locating member moved from the first position to the second position.

7. The mounting apparatus of claim 6, wherein the blocking portion comprises a fourth elastic slice extending from a side edge of the second opening, and a bending portion extending from a side edge of the fourth elastic slice; and a thickness of the first protrusion is greater than that of the first elastic slice and the bending portion.

8. The mounting apparatus of claim 1, wherein the locating member defines a first handle on the first end adjacent to the fixing portion; and the first handle is adapted to draw the fixing portion out of the two through holes and the fixing hole.

9. The mounting apparatus of claim 7, wherein the locating member defines a sliding slot on the second end adjacent to the first opening; a guiding protrusion is located at the front of the sidewall; and the guiding protrusion slides in the sliding slot and resists a distal end of the sliding slot when the locating member moved from the first position to the second position.

10. The mounting apparatus of claim 9, wherein the locating member defines a second handle on the second end adjacent to the sliding slot; and the second handle is adapted to draw the locating member from the first position to the second position.

11. A mounting apparatus assembly for a data storage device which defining a fixing hole thereon, comprising:
    a bracket having a sidewall, the sidewall comprising:
       a first through hole and a second through hole defined at a sidewall back;
       a first fixing slot and a second fixing slot defined at a sidewall front; and
    a locating member fixed on the bracket, the locating member comprising:
       a fixing portion, located on a first end of the locating member, corresponds to the first through hole, the second through hole and the fixing hole;
       a locking portion, located on a second end of the locating member, corresponds to the first fixing slot and the second fixing slot, wherein the data storage device is fixed on a first position and a second position of the bracket, in the first position, the fixing portion passes through the first through hole and the fixing hole and the locking portion engages with the first fixing slot, and in the second position, the fixing portion passes through the second through hole and the fixing hole and the locking portion engages with the second fixing slot.

12. The mounting apparatus assembly of claim 11, wherein a resisting portion is located on the locating member between the fixing portion and the locking portion, a blocking portion is located on the sidewall between the first through hole, the second through hole and the first fixing slot, the second fixing slot; when the data storage device is fixed on the first position of the bracket, the resisting portion resists the blocking portion; and when the data storage device is fixed on the second position of the bracket, the resisting portion disengages with the blocking portion.

13. The mounting apparatus assembly of claim 12, wherein a pressing portion is located on the locating member adjacent to the resisting portion; when the data storage device is fixed on the first position in the bracket, the pressing portion is in aligned with the blocking portion; and when the pressing portion is pressed toward the blocking portion, the blocking portion disengages with the resisting portion, and the locating member is moved from the first position to the second position.

14. The mounting apparatus assembly of claim 13, wherein a first opening is located on the locating member between the fixing portion an the locking portion; the resisting portion comprises a first elastic slice extending from a side edge of the first opening, and a first protrusion extending from a side edge of the first elastic slice; and when the data storage device is fixed on the first position in the bracket, the first protrusion resists the blocking portion.

15. The mounting apparatus assembly of claim 14, wherein the pressing portion comprises a second elastic slice and a third elastic slice extending from the side edge of the first opening; the second elastic slice and the third elastic slice are located on two sides of the first elastic slice; and a second protrusion is located between the second elastic slice and the third elastic slice.

16. The mounting apparatus assembly of claim 14, wherein the sidewall defines a second opening thereon between the first through hole, the second through hole and the first fixing slot, the second fixing slot; two guiding portions extend from an upper edge and a lower edge of the second opening; each guiding portion comprises a connection wall extending from the upper edge and the lower edge of the second opening, and a top wall extending from a side edge of the connection wall; the sidewall, the connection wall, and the top wall corporately forms a guiding slot therebetween; and the locating member slides along the two guiding slots when the locating member moved from the first position to the second position.

17. The mounting apparatus assembly of claim 16, wherein the blocking portion comprises a fourth elastic slice extending from a side edge of the second opening, and a bending portion extending from a side edge of the fourth elastic slice; and a thickness of the first protrusion is greater than that of the first elastic slice and the bending portion.

18. The mounting apparatus assembly of claim 11, wherein the locating member defines a first handle on the first end adjacent to the fixing portion; and the first handle is adapted to draw the fixing portion out of the two through holes and the fixing hole.

19. The mounting apparatus assembly of claim 17, wherein the locating member defines a sliding slot on the second end adjacent to the first opening; a guiding protrusion is located at the front of the sidewall; and the guiding protrusion slides in the sliding slot and resists a distal end of the sliding slot when the locating member moved from the first position to the second position.

20. The mounting apparatus assembly of claim 19, wherein the locating member defines a second handle on the second end adjacent to the sliding slot; and the second handle is adapted to draw the locating member from the first position to the second position.

* * * * *

UNITED STATES PATENT AND TRADEMARK OFFICE
CERTIFICATE OF CORRECTION

PATENT NO. : 8,434,726 B2
APPLICATION NO. : 13/272538
DATED : May 7, 2013
INVENTOR(S) : Chen et al.

Page 1 of 1

It is certified that error appears in the above-identified patent and that said Letters Patent is hereby corrected as shown below:

On the Title page, insert Item (30):

-- (30)    Foreign Application Priority Data

May 31, 2011    (CN) ........................2011 1 0143615 --

Signed and Sealed this
Fifteenth Day of October, 2013

Teresa Stanek Rea
*Deputy Director of the United States Patent and Trademark Office*